(12) United States Patent
Krecklow

(10) Patent No.: US 12,163,589 B2
(45) Date of Patent: Dec. 10, 2024

(54) ROTATING SEAL WITH OIL SLINGER

(71) Applicant: Hamilton Sundstrand Corporation, Charlotte, NC (US)

(72) Inventor: Joshua J. Krecklow, Leaf River, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/295,592

(22) Filed: Apr. 4, 2023

(65) Prior Publication Data

US 2024/0337320 A1 Oct. 10, 2024

(51) Int. Cl.
*F16J 15/34* (2006.01)
*H02K 5/124* (2006.01)

(52) U.S. Cl.
CPC .......... *F16J 15/3404* (2013.01); *H02K 5/124* (2013.01)

(58) Field of Classification Search
CPC .......... F16J 15/34; F16J 15/3404; H02K 5/124
See application file for complete search history.

(56) References Cited

U.S. PATENT DOCUMENTS

| | | | |
|---|---|---|---|
| 2,027,505 A | 1/1936 | Winkler | |
| 4,135,253 A | 1/1979 | Reich et al. | |
| 4,643,641 A | 2/1987 | Clausen et al. | |
| 5,114,446 A | 5/1992 | Giesdorf et al. | |
| 6,113,106 A | 9/2000 | Dahlheimer | |
| 8,376,368 B2 | 2/2013 | Skorucak | |
| 10,422,245 B2 * | 9/2019 | Cigal | F16J 15/164 |
| 10,746,051 B2 | 8/2020 | Walsh | |
| 10,781,718 B1 | 9/2020 | Anglin et al. | |
| 2016/0145980 A1 * | 5/2016 | Cunningham | F04D 29/104 417/423.3 |

OTHER PUBLICATIONS

European Search Report for European Application No. 24168531.2; dated Jun. 28, 2024; 9 pages.

* cited by examiner

*Primary Examiner* — Gilbert Y Lee
(74) *Attorney, Agent, or Firm* — CANTOR COLBURN LLP

(57) ABSTRACT

A face seal assembly includes a rotationally fixed first component at least partially defining an interior chamber containing a volume of lubricant. The first component includes a rotationally fixed seal element. A rotatable second component is rotatable about an axis of rotation relative to the first component. The second component includes a second component body extending along the axis of rotation from the interior chamber to outside of the interior chamber. An axially facing component surface is located in the interior chamber and is configured to engage with an axially-facing element surface of the seal element to define a seal interface of the face seal. A plurality of fins extend radially outwardly from the second component body in the chamber interior, such that the plurality of fins create a centrifugal force on the volume of lubricant to urge the volume of lubricant away from the seal interface.

16 Claims, 5 Drawing Sheets

ROTATING SEAL WITH OIL SLINGER

BACKGROUND

The present disclosure relates to rotating seals for devices such as generators, gearboxes, motors, pumps or the like.

In machines with a drive shaft or other rotating interface between a rotating component and a stationary component, the interior of the device needs to be sealed from the exterior to prevent the loss of lubricant from the inside of the device. The pressure in the interior is typically greater than the pressure at the exterior, and the interior is not flooded with lubricant, and is thus not entirely full of lubricant, but typically contains an air/oil mist or some amount of oil splash in the seal area. One typical seal configuration includes a face seal that has a rotationally stationary seal element that is urged toward contact with rotating member via a spring or other biasing element. The typical face seal is subject to leakage due to geometric imperfections, misalignment or wear after extended usage.

BRIEF DESCRIPTION

In one embodiment, a face seal assembly includes a rotationally fixed first component at least partially defining an interior chamber containing a volume of lubricant. The first component includes a rotationally fixed seal element. A rotatable second component is rotatable about an axis of rotation relative to the first component. The second component includes a second component body extending along the axis of rotation from the interior chamber to outside of the interior chamber. An axially facing component surface is located in the interior chamber and is configured to engage with an axially-facing element surface of the seal element to define a seal interface of the face seal. A plurality of fins extend radially outwardly from the second component body in the chamber interior, such that the plurality of fins create a centrifugal force on the volume of lubricant to urge the volume of lubricant away from the seal interface.

Additionally or alternatively, in this or other embodiments the axially-facing component surface is located on a component arm extending radially outwardly from the second component body, and the plurality of fins extend radially outwardly from the component arm.

Additionally or alternatively, in this or other embodiments the plurality of fins extend axially across the seal interface.

Additionally or alternatively, in this or other embodiments the seal element is urged toward the component surface via a biasing element.

Additionally or alternatively, in this or other embodiments a solid disk extends circumferentially between the plurality of fins.

Additionally or alternatively, in this or other embodiments the seal element further includes an axially extending element portion including an element arm extending radially outwardly from the axially-facing element surface, and an element arm extending radially outwardly from the axially extending portion.

Additionally or alternatively, in this or other embodiments the plurality of fins are one of axially swept, circumferentially swept or circumferentially bent along their span.

Additionally or alternatively, in this or other embodiments the seal element is one of a carbon, ceramic or polymer seal element.

In another embodiment, an electric machine includes a housing at least partially defining an interior of the electric machine, a rotatable shaft extending through a housing opening in the housing from the interior to an exterior outside the housing, and a face seal at the housing opening to seal between the shaft and the housing at the housing opening. The face seal includes a seal interface defined by a rotationally fixed seal element located at the housing opening. The seal element includes an axially-facing element face. An axially-facing planar shaft surface of the shaft is engaged with the element face. A plurality of fins of the shaft are located in the interior and extend radially outwardly from a shaft body. The plurality of fins are configured to, when the shaft rotates, impart centrifugal force on a volume of lubricant in the interior to urge the volume of lubricant away from the seal interface.

Additionally or alternatively, in this or other embodiments the axially-facing component surface is located on a component arm extending radially outwardly from the second component body, and the plurality of fins extend radially outwardly from the component arm.

Additionally or alternatively, in this or other embodiments the plurality of fins extend axially across the seal interface.

Additionally or alternatively, in this or other embodiments the seal element is urged toward the component surface via a biasing element.

Additionally or alternatively, in this or other embodiments a solid disk extends circumferentially between the plurality of fins.

Additionally or alternatively, in this or other embodiments the seal element further includes an axially extending element portion including an element arm extending radially outwardly from the axially-facing element surface, and an element arm extending radially outwardly from the axially extending portion.

Additionally or alternatively, in this or other embodiments the plurality of fins are one of axially swept, circumferentially swept or circumferentially bent along their span.

Additionally or alternatively, in this or other embodiments the seal element is one of a carbon, ceramic or polymer seal element.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
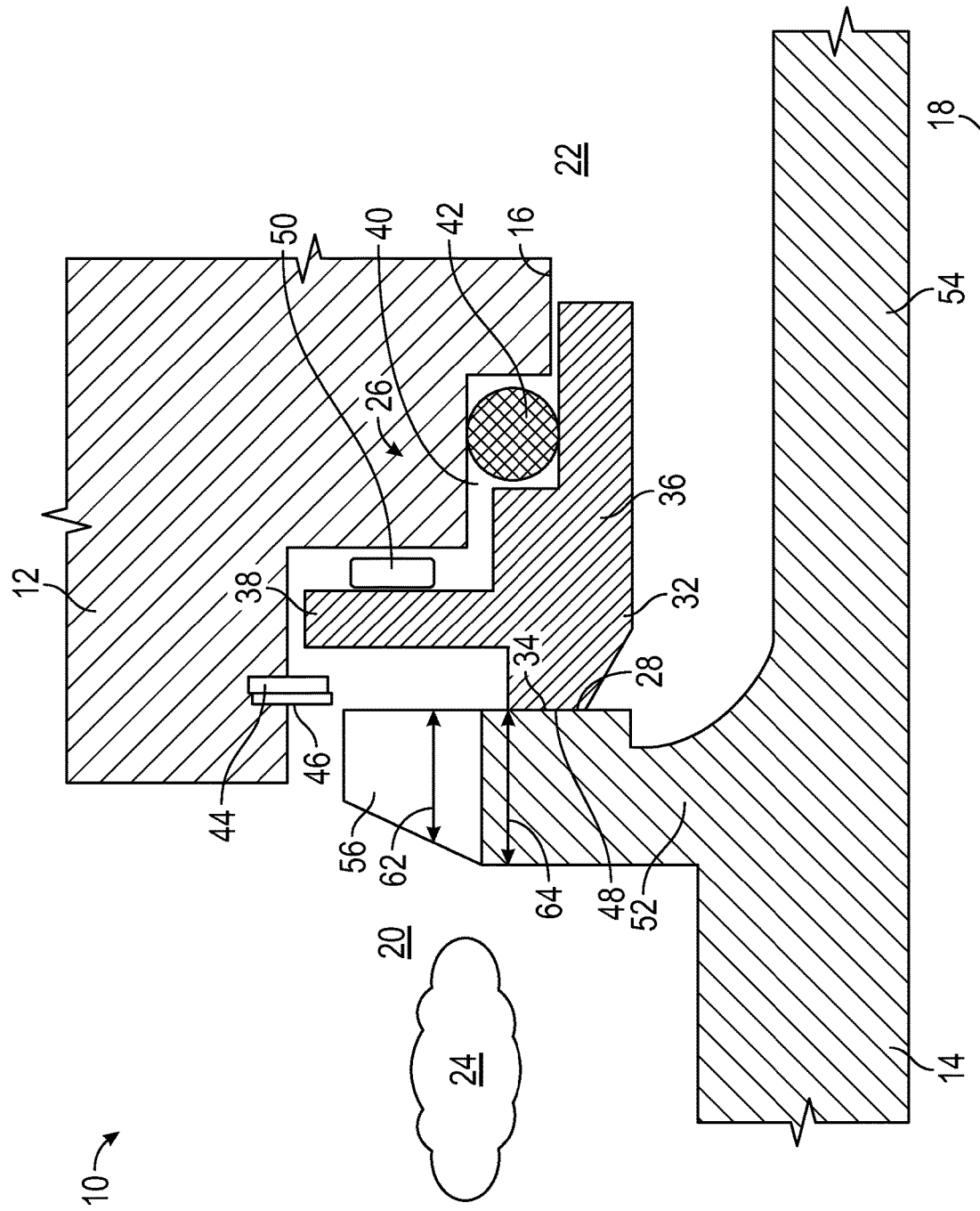
FIG. 1 is a partial cross-sectional view of an embodiment of a seal assembly of an electric machine.

Referring to FIG. 1, illustrated is a partial cross-sectional view of an electric machine 10, for example, a generator, gearbox, motor, pump or the like. The electric machine 10 includes a stationary component such as a housing 12, and a rotating component such as a shaft 14 extending through a housing opening 16 in the housing 12. The shaft 14 is configured to rotate about a shaft axis. 18, and may in some embodiments be a drive shaft or output shaft of the electric machine 10. The housing 12 at least partially defines an interior 20 of the electric machine 10 while the shaft 14 extends from the interior 20 to an exterior 22 of the electric machine 10, outside of the housing 12.

A volume of lubricant 24 is located in the interior 20 to lubricate the electric machine 10, and a seal assembly 26 at the housing opening 16 is configured to seal between the stationary housing 12 and the rotating shaft 14 to prevent the volume of lubricant 24 from exiting the interior 20 through the housing opening 16.

The seal assembly 26, where a seal interface 28 is an axial plane that in some embodiments is perpendicular to the shaft axis 18. The seal assembly 26 includes a seal element 32 installed to the housing 12 that includes a planar element surface 34, which defines a portion of the seal interface 28. Both of the housing 12 and the seal element 32 extend circumferentially around the shaft 14. In some embodiments, the seal element 32 is, for example, a carbon seal element 32, a ceramic seal element 32 or a polymer seal element 32. In some embodiments the seal element 32 includes an axially-extending seal portion 36 that includes the element surface 34, and a radially-extending element arm 38. In some embodiments, one or more ring seals 42 may be positioned along a gap 40 between the seal element 32 and the housing 12. In some embodiments, the seal assembly 26 includes a retaining ring 44 extending radially inwardly from the housing 12 to retain the seal element 32 in place. The retaining ring 44 may, in some embodiments, radially overlap the element arm 38. While in some embodiments, such as illustrated, the retaining ring 44 is a separate component installed into a groove 46 of the housing 12, in other embodiments the retaining ring 44 is formed integral to the housing 12.

The element surface 34 is urged into contact with a corresponding planar shaft surface 48 of the shaft 14 by a biasing element 50 to define the seal interface 28. In some embodiments, the biasing element 50 is a spring, such as a coil spring or a wave spring. The shaft surface 48 is located on a shaft arm 52 that extends radially outwardly from a shaft body 54 of the shaft 14. The shaft arm 52 and the shaft surface 48 extend circumferentially around the shaft body 54.

Figure 2:
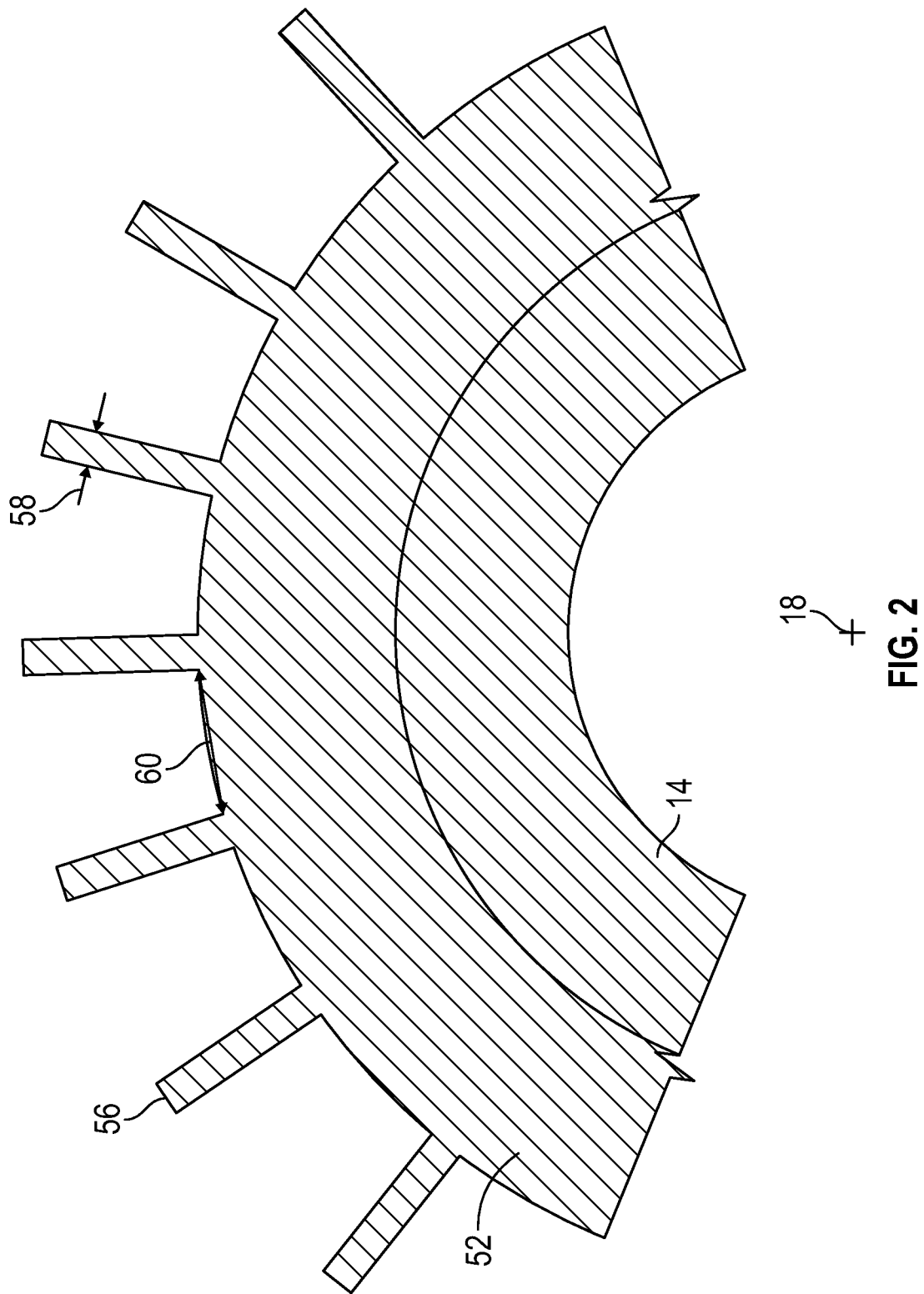
FIG. 2 is a partial cross-sectional view of an embodiment of a fin configuration of a seal assembly.
Figure 3:
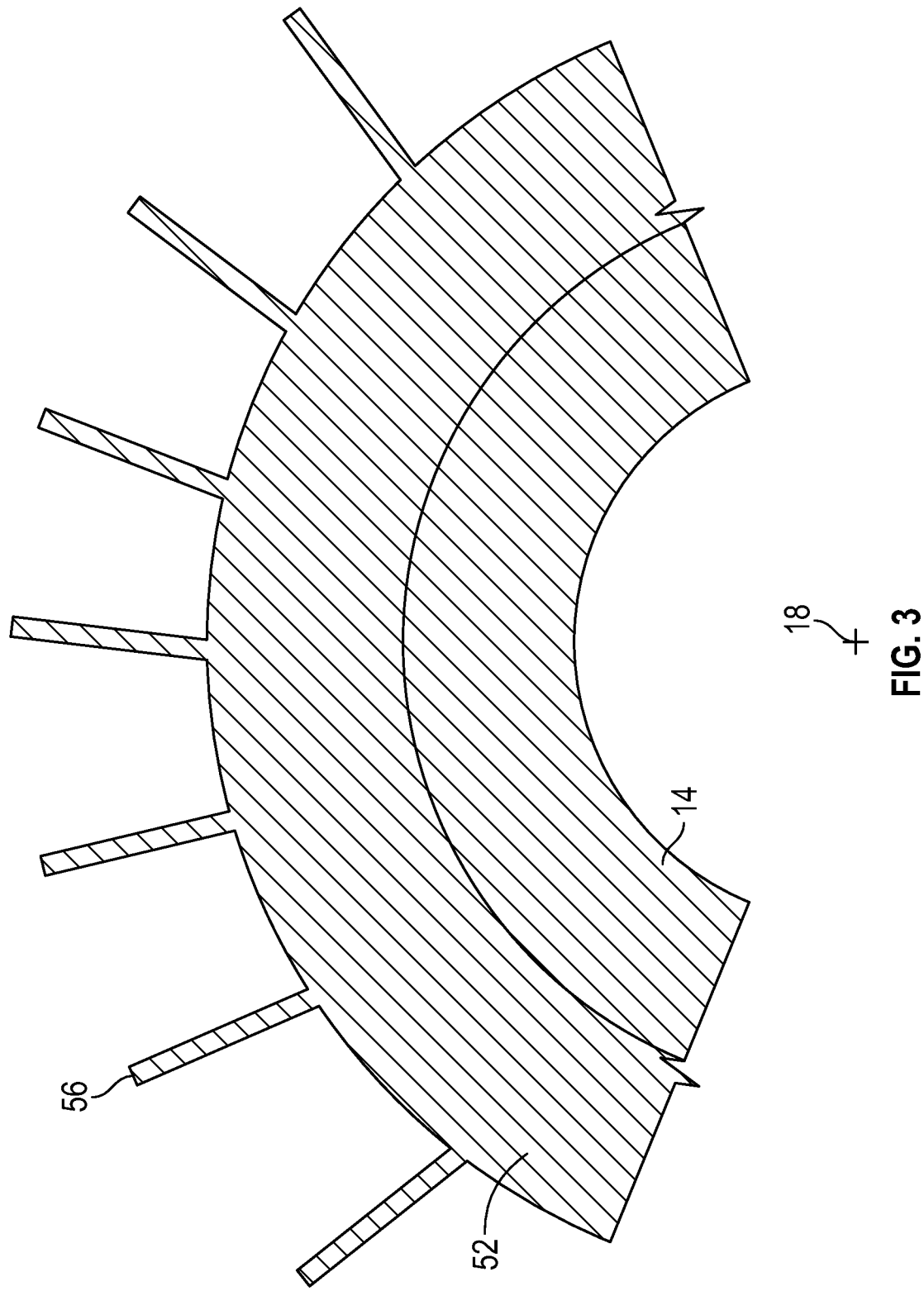
FIG. 3 is a partial cross-sectional view of another embodiment of a fin configuration of a seal assembly.
Figure 4:
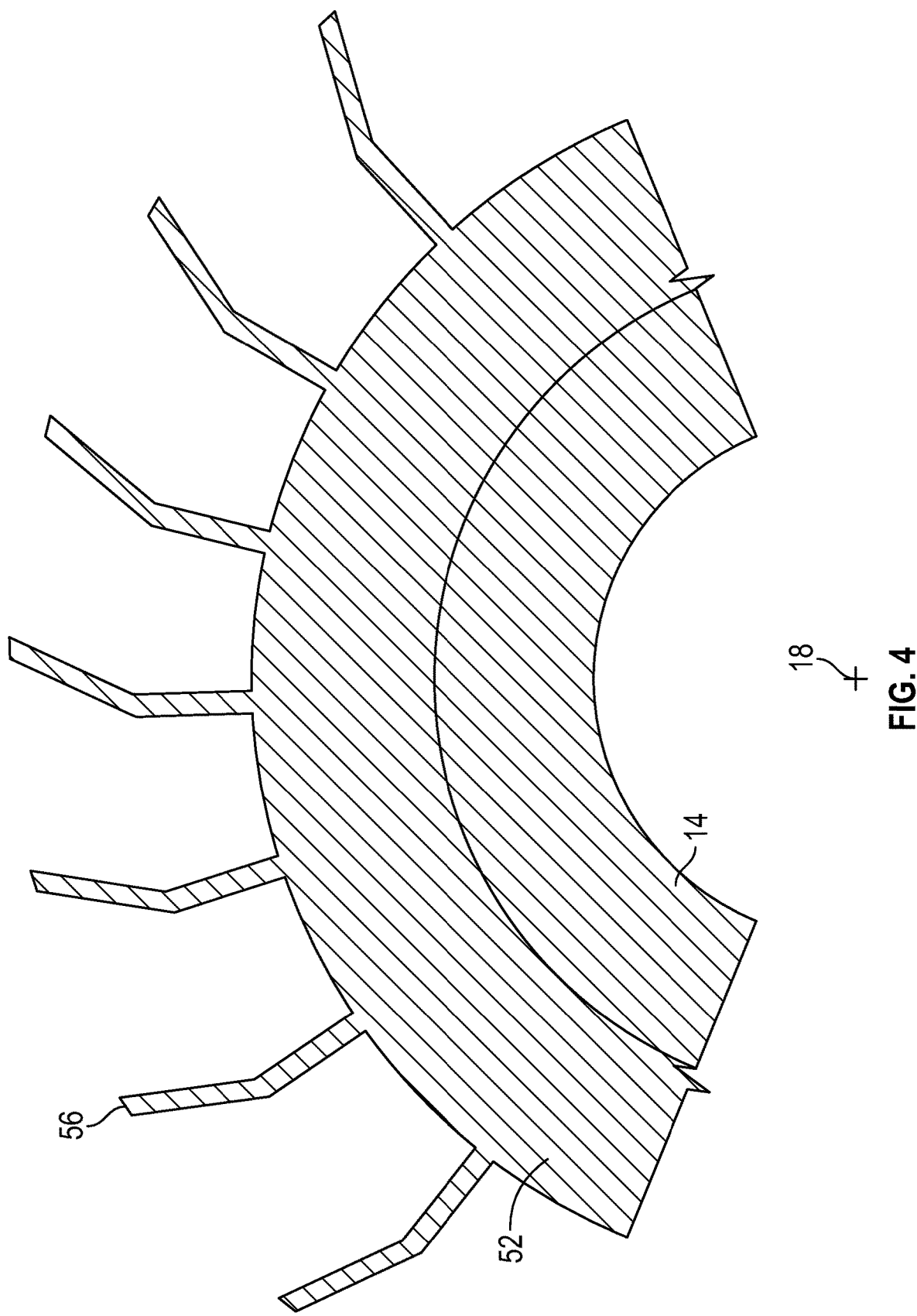
FIG. 4 is a partial cross-sectional view of yet another embodiment of a fin configuration of a seal assembly.

The shaft 14 further includes a plurality of shaft fins 56 that extend radially outwardly from the shaft arm 52. As illustrated in FIG. 2, the shaft fins 56 have a fin thickness 58 and a fin spacing 60 between circumferentially adjacent shaft fins 56. In some embodiments, such as illustrated in FIG. 2, the fins 56 are substantially flat and planar. In other embodiments, the fins may have other configurations. For example, referring now to FIG. 3, in some embodiments the plurality of fins 56 may be swept in a circumferential direction along their span, while as illustrated in FIG. 4 the fins 56 may be bent circumferentially at a location along their span. In still other embodiments, the fins 56 may be airfoil-shaped, with a curved profile along their axial length. The shape, size, orientation, quantity and spacing of the fins 56 is selected based on rotational speed of the shaft 54, available space, and desired leak prevention performance of the seal assembly 26. Additionally, other embodiments may include a solid disk having fins 56 protruding axially from the disk toward the seal interface 28, or alternatively a solid disk with radial grooves facing the seal interface 28. In both of these embodiments, the solid disk extends radially outwardly to a radial end of the fins 56 or the grooves. In operation, when the shaft 14 rotates, any lubricant 24 in the vicinity of the seal interface 28 is contacted by the rotating fins 56 and is directed away from the seal interface 28 by the centrifugal force imparted on the lubricant 24 by the fins 56. The result is that the lubricant 24 is kept away from the seal interface 28, keeping the seal interface 28 dry and preventing leakage of lubricant through the seal interface 28.

Figure 5:
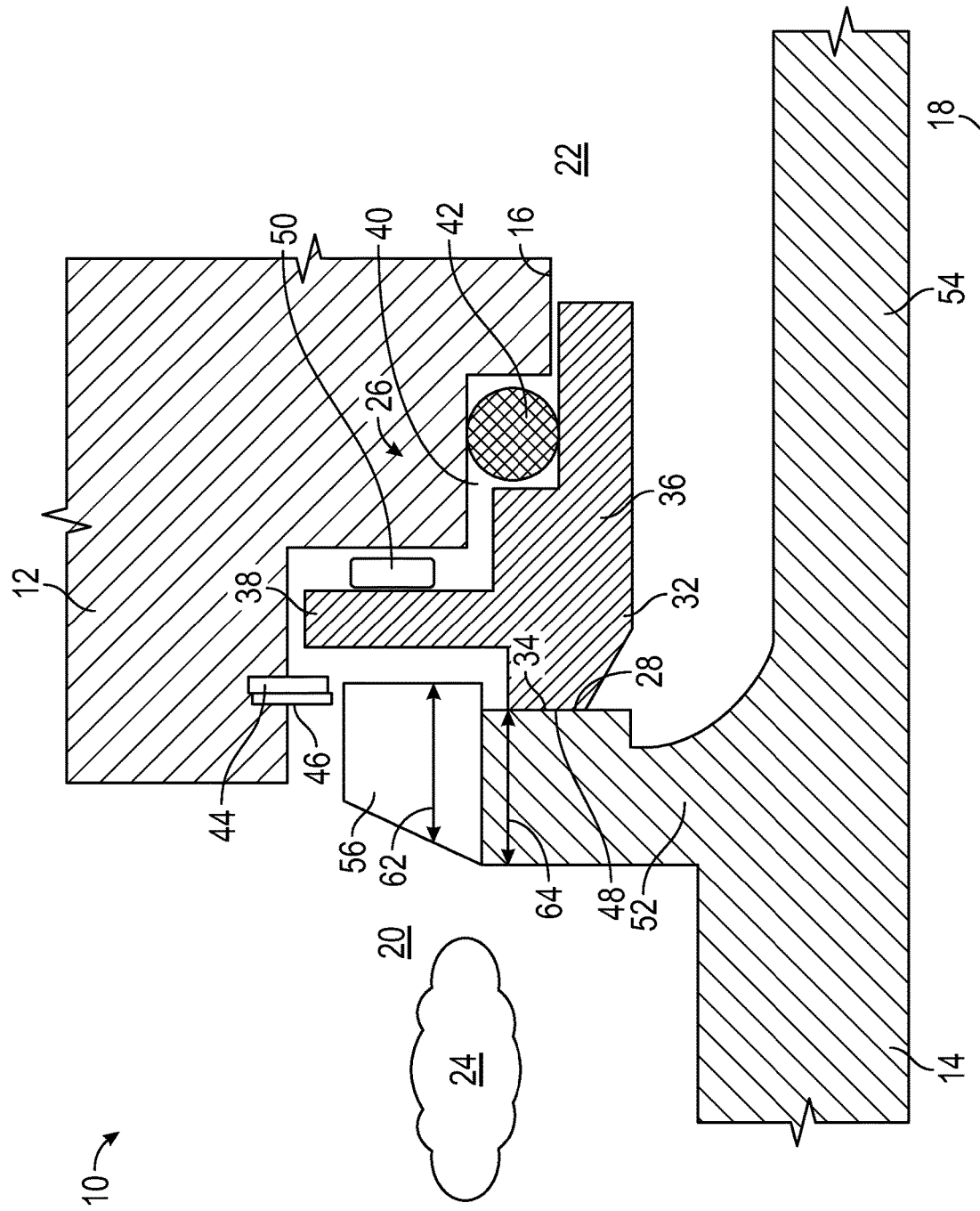
FIG. 5 is a partial cross-sectional view of another embodiment of a seal assembly of an electric machine.

Referring again to FIG. 2, in some embodiments, the fins 56 have a fin axial length 62 equal to an arm axial length 64 of the shaft arm 52. In other embodiments, such as illustrated in FIG. 5, the fins 56 have an axial length such that the fins 56 extend axially across the seal interface 28 toward the element arm 38, radially outboard of the seal interface 28. This reduces the clearance to the seal element 32 and thus increases the centrifugal pumping efficiency of the rotating fins 56.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A face seal assembly, comprising:
   a rotationally fixed first component at least partially defining an interior chamber containing a volume of lubricant, the first component including a rotationally fixed seal element; and
   a rotatable second component, the second component rotatable about an axis of rotation relative to the first component, the second component including:
   a second component body extending along the axis of rotation from the interior chamber to outside of the interior chamber;
   an axially facing component surface disposed in the interior chamber configured to engage with an axially-facing element surface of the seal element to define a seal interface of the face seal; and
   a plurality of fins extending radially outwardly from the second component body in the chamber interior, such that the plurality of fins create a centrifugal force on the volume of lubricant to urge the volume of lubricant away from the seal interface.

2. The face seal assembly of claim 1, wherein:
the axially-facing component surface is disposed on a component arm extending radially outwardly from the second component body; and
the plurality of fins extend radially outwardly from the component arm.

3. The face seal assembly of claim 1, wherein the plurality of fins extend axially across the seal interface.

4. The face seal assembly of claim 1, wherein the seal element is urged toward the component surface via a biasing element.

5. The face seal assembly of claim 1, wherein a solid disk extends circumferentially between the plurality of fins.

6. The face seal of assembly of claim 1, wherein the seal element further comprises:
an axially extending element portion including an element arm extending radially outwardly from the axially-facing element surface; and
an element arm extending radially outwardly from the axially extending portion.

7. The face seal assembly of claim 1, wherein the plurality of fins are one of axially swept, circumferentially swept or circumferentially bent along their span.

8. The face seal assembly of claim 1, wherein the seal element is one of a carbon, ceramic or polymer seal element.

9. An electric machine, comprising:
a housing at least partially defining an interior of the electric machine;
a rotatable shaft extending through a housing opening in the housing from the interior to an exterior outside the housing; and
a face seal at the housing opening to seal between the shaft and the housing at the housing opening, the face seal including:
a seal interface defined by:
a rotationally fixed seal element disposed at the housing opening, the seal element including an axially-facing element face; and
an axially-facing planar shaft surface of the shaft engaged with the element face; and
a plurality of fins of the shaft disposed in the interior and extending radially outwardly from a shaft body, the plurality of fins configured to, when the shaft rotates, impart centrifugal force on a volume of lubricant in the interior to urge the volume of lubricant away from the seal interface.

10. The electric machine of claim 9, wherein:
the axially-facing component surface is disposed on a component arm extending radially outwardly from the second component body; and
the plurality of fins extend radially outwardly from the component arm.

11. The electric machine of claim 9, wherein the plurality of fins extend axially across the seal interface.

12. The electric machine of claim 9 wherein the seal element is urged toward the component surface via a biasing element.

13. The electric machine of claim 9, wherein a solid disk extends circumferentially between the plurality of fins.

14. The electric machine of claim 9, wherein the seal element further comprises:
an axially extending element portion including an element arm extending radially outwardly from the axially-facing element surface; and
an element arm extending radially outwardly from the axially extending portion.

15. The electric machine of claim 9, wherein the plurality of fins are one of axially swept, circumferentially swept or circumferentially bent along their span.

16. The electric machine of claim 9, wherein the seal element is one of a carbon, ceramic or polymer seal element.

* * * * *